US011049490B2

(12) United States Patent
Deng et al.

(10) Patent No.: US 11,049,490 B2
(45) Date of Patent: Jun. 29, 2021

(54) AUDIO PLAYBACK DEVICE AND AUDIO PLAYBACK METHOD THEREOF FOR ADJUSTING TEXT TO SPEECH OF A TARGET CHARACTER USING SPECTRAL FEATURES

(71) Applicant: Institute For Information Industry, Taipei (TW)

(72) Inventors: Guang-Feng Deng, Taipei (TW); Cheng-Hung Tsai, Tainan (TW); Tsun Ku, Taipei (TW); Zhi-Guo Zhu, Taipei (TW); Han-Wen Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 123 days.

(21) Appl. No.: 16/207,078

(22) Filed: Nov. 30, 2018

(65) Prior Publication Data

US 2020/0135169 A1 Apr. 30, 2020

(30) Foreign Application Priority Data

Oct. 26, 2018 (TW) ................................ 107138001

(51) Int. Cl.
*G10L 13/00* (2006.01)
*G10L 13/02* (2013.01)
*H04M 1/72436* (2021.01)
*G10L 13/033* (2013.01)

(52) U.S. Cl.
CPC .......... *G10L 13/0335* (2013.01); *G10L 13/00* (2013.01)

(58) Field of Classification Search
CPC .......................... G10L 13/00; H04M 1/42552
USPC .......................................... 704/260; 379/67.1
See application file for complete search history.

(56) References Cited

U.S. PATENT DOCUMENTS

| | | | |
|---|---|---|---|
| 7,027,568 B1 * | 4/2006 | Simpson ........... | H04M 1/72552 379/67.1 |
| 9,667,574 B2 | 5/2017 | Bruns et al. | |
| 9,978,359 B1 * | 5/2018 | Kaszczuk ............... | G10L 13/02 |
| 2003/0028380 A1 * | 2/2003 | Freeland ................ | G10L 13/00 704/260 |
| 2014/0046667 A1 | 2/2014 | Yeom et al. | |
| 2015/0042662 A1 | 2/2015 | Latorre-Martinez et al. | |

FOREIGN PATENT DOCUMENTS

| | | |
|---|---|---|
| AU | 2016409890 B2 | 12/2017 |
| CN | 103503015 A | 1/2014 |
| CN | 107481735 A | 12/2017 |

OTHER PUBLICATIONS

Office Action to the corresponding Taiwan Patent Application rendered by the Taiwan Intellectual Property Office (TIPO) dated Feb. 25, 2019, 15 pages (including English translation).

* cited by examiner

*Primary Examiner* — Farzad Kazeminezhad
(74) *Attorney, Agent, or Firm* — Skaar Ulbrich Macari, P.A.

(57) ABSTRACT

An audio playback device receives an instruction from a user to select a target voice model from a plurality of voice models and assigns the target voice model to a target character in a text. The audio playback device also transforms the text into a speech, and during the process of transforming the text into the speech, transforms sentences of the target character in the text into the speech of the target character according to the target voice model.

20 Claims, 5 Drawing Sheets

AUDIO PLAYBACK DEVICE AND AUDIO PLAYBACK METHOD THEREOF FOR ADJUSTING TEXT TO SPEECH OF A TARGET CHARACTER USING SPECTRAL FEATURES

PRIORITY

This application claims priority to Taiwan Patent Application No. 107138001 filed on Oct. 26, 2018, which is hereby incorporated by reference in its entirety.

FIELD

The present disclosure relates to an audio playback device and an audio playback method. More particularly, the present disclosure relates to an audio playback device and an audio playback method for transforming the sentences of a target character in a text into an audio presentation designated by the user.

BACKGROUND

Conventional audio playback devices for playing stories or other contents (e.g., an audio book, a story-telling machine) generally adopts a fixed audio playback mode to transform a text (e.g., a story, a novel, a prose, a poetry, etc.) into an audio. For instance, the conventional audio playback devices may store an audio file for the text, and then play the audio file to present the contents of the text, wherein the audio file is mostly formed by recording a corresponding sound for the sentences in the text through a voice actor or a computer device. Since the audio presentation of the conventional audio playback device is fixed, monotonous, and immutable, it is easy to lower the user's interests and thus cannot attract the user for long-term use. In view of this, it is very important to the technical field to improve the conventional audio playback devices limited to a single way of audio presentation.

SUMMARY

Provides is an audio playback device. The audio playback device may comprise a storage, an input device, a processor and an output device. The processor may be electrically connected with the input device, the storage and the output device respectively. The storage may be configured to store a text. The input device may be configured to receive a first instruction from a user. The processor may be configured to select a target voice model from a plurality of voice models according to the first instruction, and assign the target voice model to a target character in the text. The processor may be further configured to transform the text into an audio comprising a speech of the target character. The output device may be configured to play the audio. The processor may be further configured to transform sentences of the target character in the text into the speech of the target character according to the target voice model during the process of transforming the text into the audio.

Also provided is an audio playback method for use in an audio playback device. The audio playback method may comprise:

receiving, by the audio playback device, a first instruction from a user;

selecting, by the audio playback device, a target voice model from a plurality of voice models according to the first instruction, and assigning the target voice model to a target character in the text;

transforming, by the audio playback device, the text into an audio, wherein the audio comprises a speech of the target character; and playing, by the audio playback device, the audio;

wherein during the process of transforming the text into the audio, the audio playback method further comprises:

transforming, by the audio playback device, sentences of the target character in the text into the speech of the target character according to the target voice model.

With the audio playback device and the audio playback method, the user may select a voice model from various voice models to generate the corresponding speech for any character in a text according to his/her own preference. The audio playback device and the audio playback method are able to provide multiple customizations of the audio presentation, and hence effectively solve the aforesaid problem that the conventional audio playback devices are limited to a single way of audio presentation while playing a story or text.

The aforesaid content is not intended to limit the present invention, but merely describes the technical problems that can be solved by the present invention, the technical means that can be adopted, and the technical effects that can be achieved, so that people having ordinary skill in the art can basically understand the present invention. People having ordinary skill in the art can understand the various embodiments of the present invention according to the attached figures and the content recited in the following embodiments.

DETAILED DESCRIPTION

The exemplary embodiments described below are not intended to limit the present invention to any specific example, embodiment, environment, applications, structures, processes or steps as described in these example embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
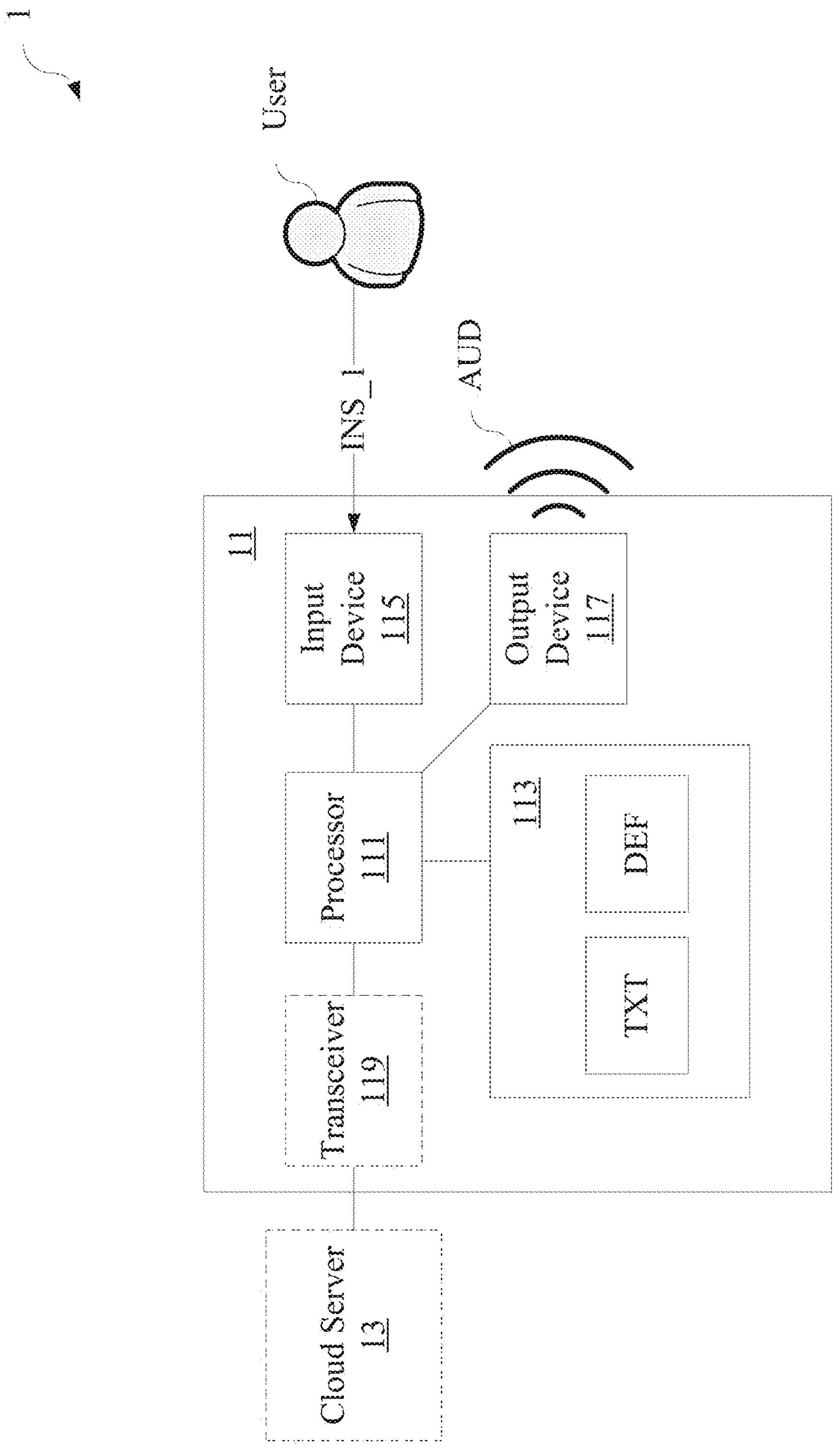
FIG. 1 illustrates a schematic view of an audio playback system according to one or more embodiments of the present invention.

FIG. 1 illustrates a schematic view of an audio playback system according to one or more embodiments of the present invention. The contents shown in FIG. 1 are merely for explaining the embodiments of the present invention instead of limiting the present invention.

Referring to FIG. 1, an audio playback system 1 may comprise an audio playback device 11 and a cloud server 13. The audio playback device 11 may comprise a processor 111 and a storage 113, an input device 115, an output device 117 and a transceiver 119 that are electrically connected with the processor 111 respectively. The transceiver 119 is coupled with the cloud server 13 so as to communicate therewith. In some embodiments, the audio playback system 1 may not comprise the cloud server 13 and the audio playback device 11 may not comprise the transceiver 119.

The storage 113 may be configured to store data produced by the audio playback device 11, data received from the cloud service 13, and/or data input by the user. The memory 113 may comprise a first level memory (also referred to as main memory or internal memory), and the processor 111 may directly read the instructions set stored in the first level memory and execute the instructions sets as needed. The storage 113 may optionally comprise a second level memory (also referred to as an external memory or a secondary memory), and the memory may transmit the stored data to the first level memory through the data buffer. For example, the second level memory may be, but not limited to, a hard disk, a compact disk, or the like. The storage 113 may optionally comprise a third level memory, that is, a storage device that may be directly inserted or removed from a computer, such as a portable hard disk.

In some embodiments, the storage 113 may store a text TXT. The text TXT may be various text files. For instance, the text TXT may be but not limited to a text file related to a story, a novel, a prose, or a poetry. The text TXT may comprise at least one character and at least one sentence corresponding to the at least one character. For example, when the text TXT is related to a fairy tale, it may comprise such characters as an emperor, a queen, a prince, a princess and a narrator, and such sentences as dialogues, monologues or lines corresponding to the characters.

The input device 115 may be a device that allows the user to input various instructions to the audio playback device 11, such as a standalone keyboard, a standalone mouse, a combination of a keyboard, a mouse and a monitor, a combination of a voice control device and a monitor, or a touch screen. The output device 117 may be a device that is able to play sounds, such as speakers or headphones. In some embodiments, the input device 115 and the output device 117 may be integrated as a single device.

The transceiver 119 is connected to the cloud server 13, and they communicate with each other in a wired or a wireless manner. The transceiver 119 may be composed of a transmitter and a receiver. Taking wireless communications for example, the transceiver 119 may comprise, but not limited to, an antenna, an amplifier, a modulator, a demodulator, a detector, an analog to digital converter, a digital to analog converter, etc. Taking wired communications for example, the transceiver 119 may be, but not limited to, a gigabit Ethernet transceiver, a Gigabit Interface Converter (GBIC), a Small form-factor pluggable (SFP) transceiver, a Ten Gigabit Small Form Factor Pluggable (XFP) transceiver, etc.

The cloud server 13 may be a device such as a computer device or a network server with functions such as calculating and storing data, and transmitting data in a wired network or in a wireless network.

The processor 111 may be a microprocessor or a microcontroller having a signal processing function. A microprocessor or microcontroller is a programmable special integrated circuit that has the functions of operation, storage, output/input, etc., and can accept and process various coding instructions, thereby performing various logic operations and arithmetic operations, and outputting the corresponding operation result. The processor 111 may be programmed to execute various operations or programs in the audio playback device 11. For example, the processor 111 may be programmed to transform the text TXT into an audio AUD.

Figure 2:
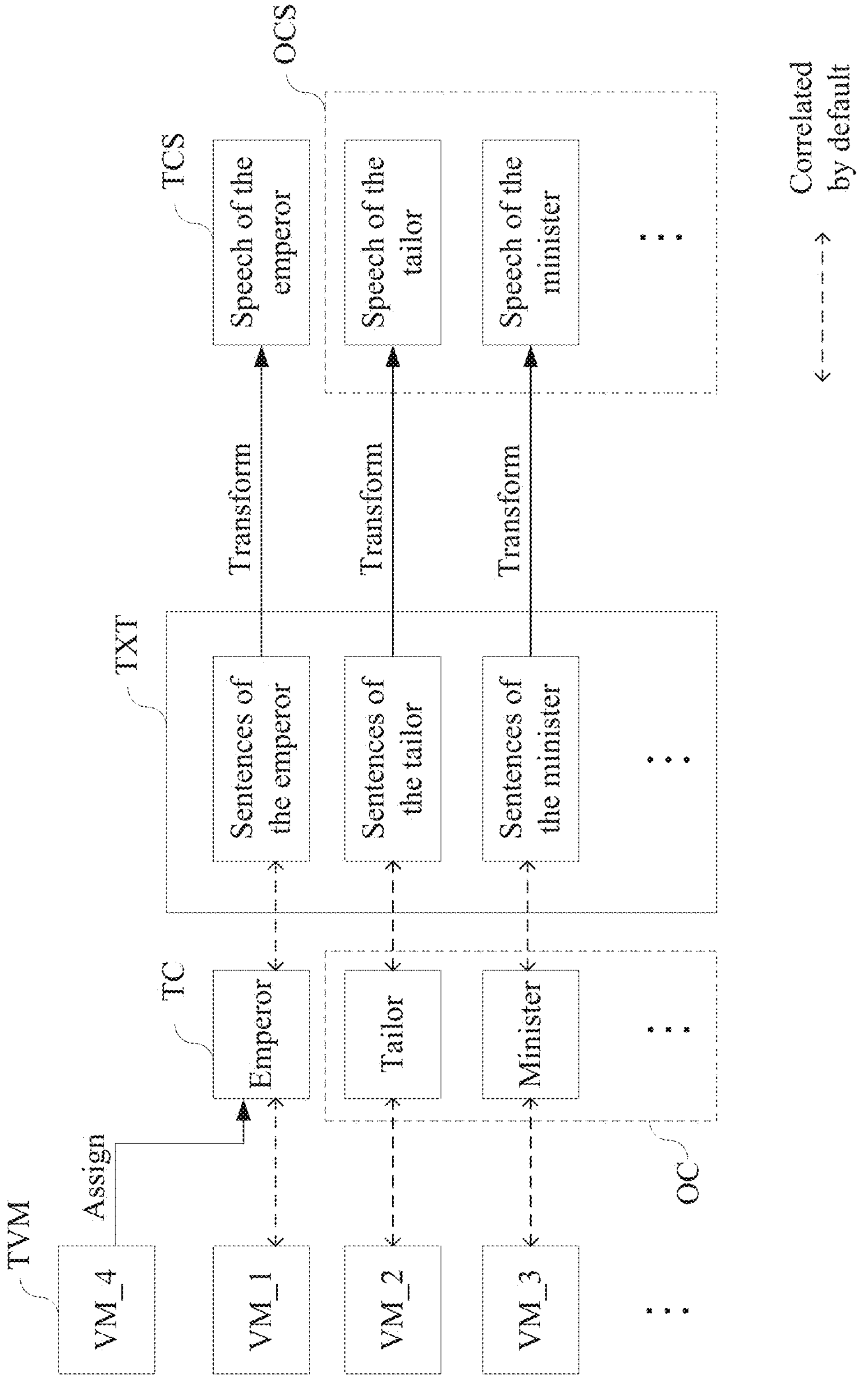
FIG. 2 illustrates a schematic view of the correlations between the voice models, the characters in the text, the sentences in the text and the speeches according to one or more embodiments of the present invention.

FIG. 2 illustrates a schematic view of the correlations between the voice models, the characters in the text, the sentences in the text and the speeches according to one or more embodiments of the present invention. The contents shown in FIG. 2 are merely for explaining the embodiments of the present invention instead of limiting the present invention.

Referring to FIG. 1 and FIG. 2 together, in some embodiments, the user may provide a first instruction INS_1 to the processor 111 via the input device 115, and the processor 111 may select a target voice model TVM from a plurality of voice models (e.g., voice model VM_1, voice model VM_2, voice model VM_3, voice model VM_4, . . . ) according to the first instruction INS_1, and then assign the target voice model TVM to a target character TC in the text TXT. After that, the processor 111 may transform the sentences belonging to the target character TC in the text TXT into a speech TCS of the target character TC according to the target voice model TVM.

In some embodiments, besides the text TXT, the storage 113 may further store a pre-established data DEF. The pre-established data DEF may be configured to record one or more other characters OC in the text TXT and a plurality of other voice models (e.g., the voice model VM_2, the voice model VM_3, the voice model VM_4, . . . ) corresponding to the other characters OC. Moreover, the processor 111 may transform the sentences belonging to the other characters OC in the text TXT into a speech OCS of the other characters OC via the other voice models corresponding to the other characters OC in the text TXT according to the pre-established data DEF. After generating the speech TCS of the target character TC and the speech OCS of the other characters OC, the processor 111 may merge these speeches into an audio AUD, and may play the audio ADU via the output device 117.

For instance, as shown in FIG. 2, it is assumed that the text TXT is the fairy tale named "The Emperor's New Clothes" comprising a plurality of characters such as "the emperor", the tailor and the minister, etc., and the voice model VM_1, the voice model VM_2 and the voice model VM_3 are assigned, by default, to the emperor, the tailor and the minister respectively. In this case, if the processor 111 learns from the first instruction INS_1 that the user wants to assign the voice model VM_4 to dub the target character TC, i.e., "the emperor", which by default is dubbed by the voice model VM_1, the processor 111 may select the voice model VM_4 from a plurality of voice models as the target voice model TVM, and assign the voice model VM_4 to "the emperor", which is the target character TC. Then, the processor 111 may transform the sentences belonging to "the emperor" in the text TXT into the speech of "the emperor" via a text-to-speech (TTS) engine, and make it the speech TCS of the target character TC. Moreover, the processor 111 may further learn other voice models corresponding to the other characters OC (e.g., the tailor and the minister) in the text TXT according to the pre-established data DEF, i.e., the voice model VM_2 and the voice model VM_3, and transform the sentences belonging to the tailor and the minister in the text TXT into the speeches of the tailor and the minister according to the voice model VM_2 and the voice model VM_3 to form the speech OCS of the other characters OC. Finally, the processor 111 may merge the speech TCS of the target character TC and the speech OCS of the other characters OC into the audio AUD and play the audio AUD via the output device 117.

Figure 3A:
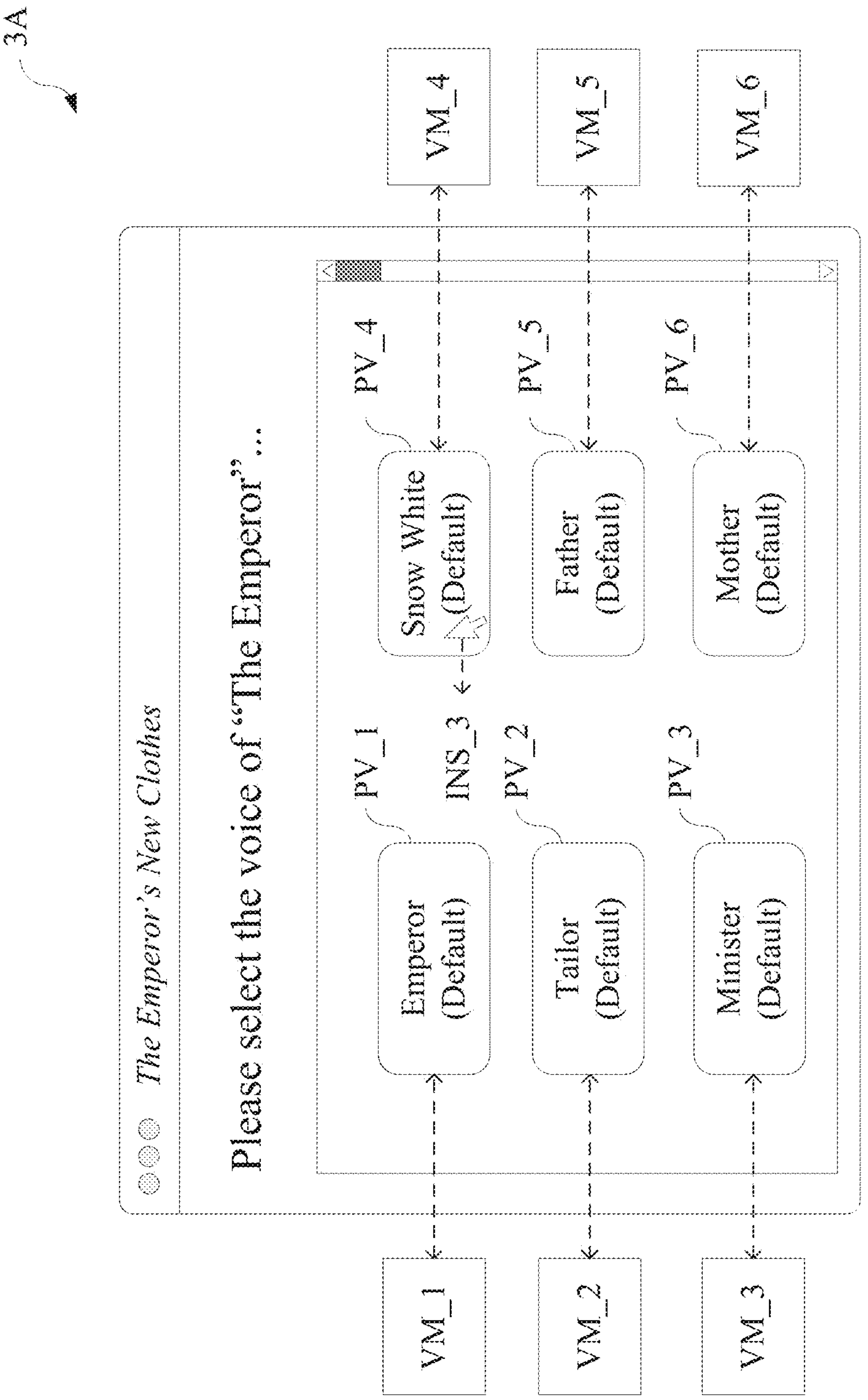
FIG. 3A illustrates a schematic view of a user interface provided by an audio playback device according to one or more embodiments of the present invention.
Figure 3B:
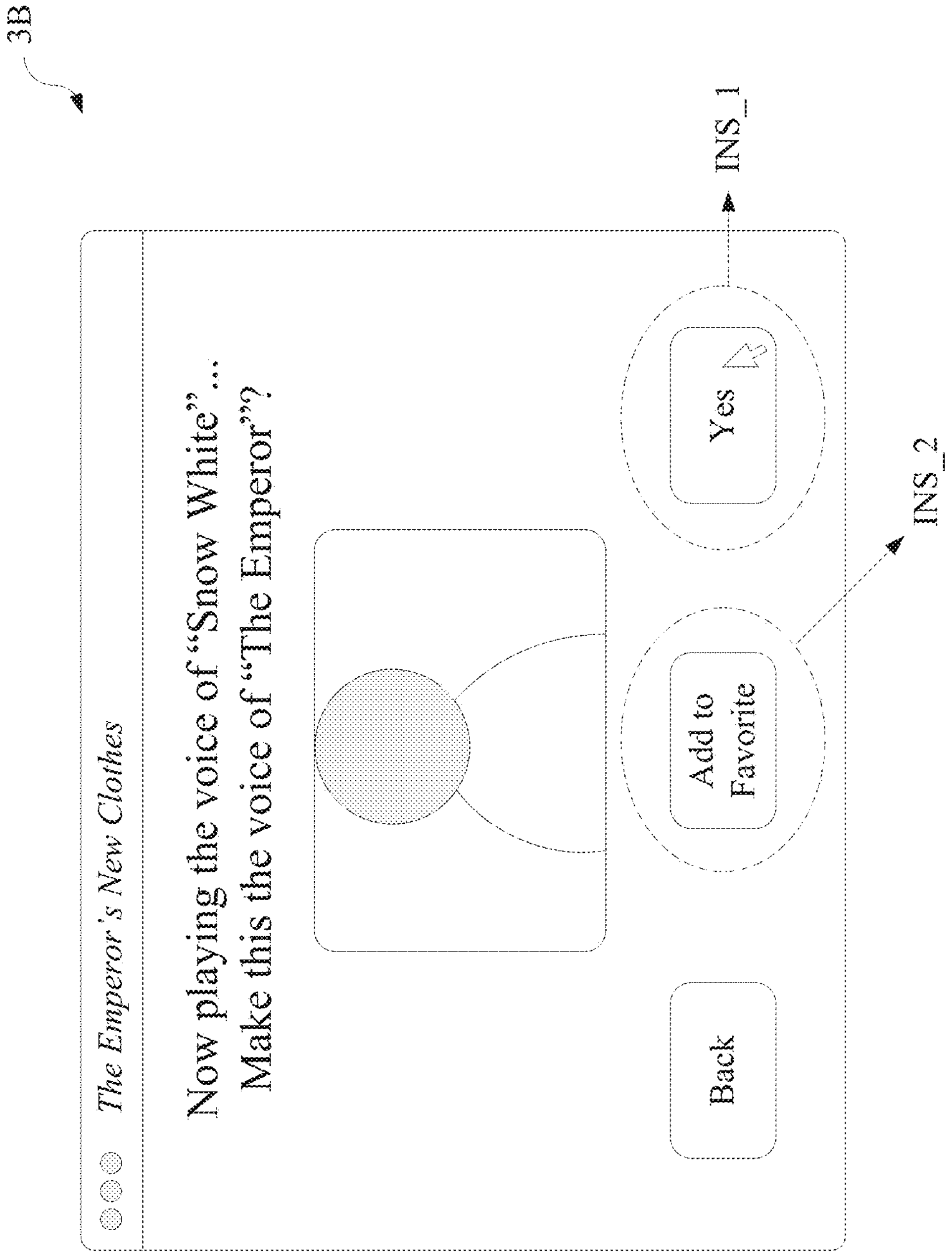
FIG. 3B illustrates another schematic view of a user interface provided by an audio playback device according to one or more embodiments of the present invention.

FIG. 3A illustrates a schematic view of a user interface provided by an audio playback device according to one or more embodiments of the present invention. FIG. 3B illustrates another schematic view of a user interface provided by an audio playback device according to one or more embodiments of the present invention. The contents shown in FIG. 3A and FIG. 3B are merely for explaining the embodiments of the present invention instead of limiting the present invention.

Referring to FIG. 1, FIG. 2, FIG. 3A and FIG. 3B together, in some embodiments, the processor 111 may provide a user interface (for example but not limited to a graphic user interface (GUI)) so that the user may provide various instructions to the processor 111 via the input device 115. Specifically, the user may browse a plurality of files for trial listening, e.g., the file PV_1, the file PV_2, . . . , the file PV_6, that are related to a plurality of voice models, e.g., voice model VM_1, voice model VM_2, . . . , voice model VM_6, on a page 3A of the user interface, and may click on the page 3A to select any of the file PV_1, the file PV_2, . . . , the file PV_6 for trial listening to provide a third instruction INS_3 to the input device 115. While the user selects any of the file PV_1, the file PV_2, . . . , the file PV_6 for trial listening, a page 3B of the user interface is presented and the output device 117 plays the selected file. For instance, there is a case with the assumption that the text TXT is still the fairy tale named "The Emperor's New Clothes" and the user is browsing the dubbing content for "the emperor", which is the target character TC. In this case, the user may click on any of the files for trial listening to enter the page 3B of the user interface from the page 3A of the user interface. For example, the user may click on a file PV_4 for trial listening corresponding to the voice model VM_4 to provide a third instruction INS_3 to the input device 115, and according to the third instruction INS_3, the user interface may present the page 3B and the output device 117 may play the file PV_4 for the user for trial listening. In such an example, all of the voice model VM_1, the voice model VM_2 and the voice model VM_3 are the voice models corresponding to the characters in the text TXT named "The Emperor's New Clothes," but the voice model VM_4, the voice model VM_5 and the voice model VM_6 are not. The voice model VM_4 is a voice model corresponding to the character "Snow White" in the fairy tale named "The Snow White", and the voice model VM_5 and the voice model VM_6 are the voice models corresponding to the characters in the real world, such as a father and a mother respectively.

In the page 3B of the user interface, the user may determine whether to adopt the voice model VM_4 corresponding to the file PV_4 for trial listening as the target voice model TVM for dubbing the target character TC. If the user determines to adopt the voice model VM_4 corresponding to the file PV_4 for trial listening as the target voice model TVM for dubbing the target character TC, he/she may click on the "Yes" button on the page 3B of the user interface to provide a first instruction INS_1 to the processor 111 via the input device 115. If the user wants to collect the voice model VM_4 corresponding to the file PV_4 for trial listening as a favorite voice model, he/she may click on the "Collect" button on the page 3B of the user interface to provide a second instruction INS_2 to the processor 111 via the input device 115.

The way of presenting the page 3A and the page 3B of the user interface is merely an exemplary aspect of the various embodiments of the present invention rather than a limitation.

In some embodiments, the processor 111 or the cloud server 13 may establish a voice parameter adjustment mode corresponding to a specific personality so as to know how to adjust the sound parameters when building the voice models corresponding to various kinds of personality. The specific personality may be, but not limited to, any of: cheerful personality, narcissistic personality, emotional personality, easygoing personality, obnoxious, etc.

Each of the voice models, i.e., voice model VM_1, voice model VM_2, voice model VM_3, and so on, may be built according to a known personality (e.g., a narcissistic personality) corresponding to the voice (e.g., a voice of a narcissist) of an audio file and acoustic features extracted from the audio file by the processor 111 of the audio playback device 11 or the cloud server 13. Alternatively, each of the abovementioned voice models, i.e., voice model VM_1, voice model VM_2, voice model VM_3, and so on, may also be built by adjusting, according to a specific personality, acoustic features extracted from an audio file by the processor 111 of the audio playback device 11 or the cloud server 13. Based on different requirements, the voice models may be stored in the storage 113 of the audio playback device 11 or in the cloud server 13.

For instance, the acoustic features extracted from an audio file may comprise a pitch feature, a speaking-rate feature, a spectral feature and a volume feature. The pitch feature is related to the "F0 range" and/or the "F0 mean"; the speaking-rate feature is related to the tempo of the voice; the spectral feature is related to the spectrum parameter; and the volume feature is related to the loudness of the voice. The descriptions of the pitch feature, the speaking-rate feature, the spectral feature and the volume feature of the voice are merely by way of examples instead of limitations.

After extracting the pitch feature, the speaking-rate feature, the spectral feature, and the volume feature of a certain audio file, the processor 111 or the cloud server 13 may adjust the pitch parameter, the speaking-rate parameter, the spectral parameter, and the volume parameter which correspond to the pitch feature, the speaking-rate feature, the spectral feature, and the volume feature respectively according to the voice parameter adjustment mode corresponding to a specific personality, so as to build each of the voice models corresponding to different types of personality. Alternatively, after extracting the pitch feature, the speaking-rate feature, the spectral feature, and the volume feature of a certain audio file, the processor 111 or the cloud server 13 may also determine that these features correspond to a specific type of personality, and adjust the pitch parameter, the speaking-rate parameter, the spectral parameter, and the volume parameter which correspond to the pitch feature, the speaking-rate feature, the spectral feature, and the volume feature respectively according to the voice parameter adjustment mode corresponding to the determined type of personality. For example, the processor 111 or the cloud server 13 may learn from analyzing the sentences (or the keywords) belonging to the character of "the emperor" in the text TXT named "The Emperor's New Clothes" that the specific personality of "the emperor" is "arrogant personality", and may then select, from the voice models, the voice model corresponding to (or closely related to) the arrogant personality for dubbing “the emperor”.

To be more specific, the processor 111 or the cloud server 13 may collect and analyze the voice of the user, or the parent or family of the user, and build the corresponding voice models respectively in advance, wherein each of the voice models may comprise a submodel of tone, and the submodel of tone may comprise a pitch parameter, a speaking-rate parameter, a spectral parameter and a volume parameter which can correspond to various types of personality by adjustments. That is, the processor 111 or the cloud server 13 may adjust the pitch parameters, the speaking-rate parameters, the spectral parameters and the volume parameters comprised in the submodels of tone according to various types of specific personality, so as to build a plurality of voice models corresponding to various types of personality respectively. For instance, the processor 111 or the cloud server 13 may adjust the submodel of tone of a voice model, specifically by increasing the pitch parameter by 50%, decreasing the speaking-rate parameter by 10%, increasing the spectral parameter by 15% and increasing the volume parameter by 5%, when attempting to adjust the voice model to correspond to “romantic personality”.

In some embodiments, the processor 111 or the cloud server 13 may analyze the content of each text TXT to learn the personality of each of the characters of each text TXT, and then assign a default voice model for each of the characters. For instance, the processor 111 or the cloud server 13 may learn from analyzing the sentences (or the keywords) belonging to the character of “the emperor” in the text TXT named “The Emperor’s New Clothes” that the specific personality of “the emperor” is “arrogant personality”, and may then assign the voice model corresponding to (or closely related to) the arrogant personality for “the emperor”.

In some embodiments, besides the submodel of tone, each of the voice models may further comprise a submodel of emotion. Each submodel of emotion may comprise different emotion-switching parameters, including but not limited to happiness, anger, doubt, sadness, etc. Each emotion-switching parameter may be configured to adjust the pitch parameter, the speaking-rate parameter, the spectral parameter and the volume parameter of the corresponding submodel of tone. Moreover, the processor 111 may analyze the emotion-related keyword in the sentences belonging to any character in the text TXT to identify the sentence emotions of the character, and then use the submodel of emotion of the voice model to adjust the corresponding submodel of tone according to each of sentence emotions. For example, as shown in FIG. 2, it is assumed that the processor 111 has identified a sentence emotion of “the emperor”, which is the target character TC, is “happiness”, “anger” or “doubt” according to the emotion-related keyword such as “laughed”, “yelled” or “questioned” in a sentence of “the emperor” in the text TXT. In this case, during the process of transforming the sentence of “the emperor”, which is the target character TC, into the speech TCS of the target character TC, the processor 111 may use the submodel of emotion comprised in the assigned voice model VM_4 to adjust the pitch parameter, the speaking-rate parameter, the spectral parameter and the volume parameter of the submodel of tone comprised in the assigned voice model VM_4 according to the sentence emotion of “happiness”, “anger” or “doubt”. Thereby, the output device 117 may output the speech of “the emperor” with various emotions In some embodiments, an audio file may be recorded by a speaker. For instance, the audio file may be recorded by the user, the family of the user or a professional voice actor repeating a plurality of default corpus (e.g., a hundred sentences).

In some embodiments, the audio file may be obtained from sources that contains human voices, such as a soundtrack of a video, a radio show, an opera, etc. For example, the audio file may be a soundtrack file derived from capturing the sentences of a superhero in a hero film.

In some embodiments, the number of target character TC may be more than one. The corresponding processes on this case where more than one target character TC is necessary may be easily understood by people having ordinary skill in the art based on the descriptions above, and hence will not be further described herein.

Figure 4:
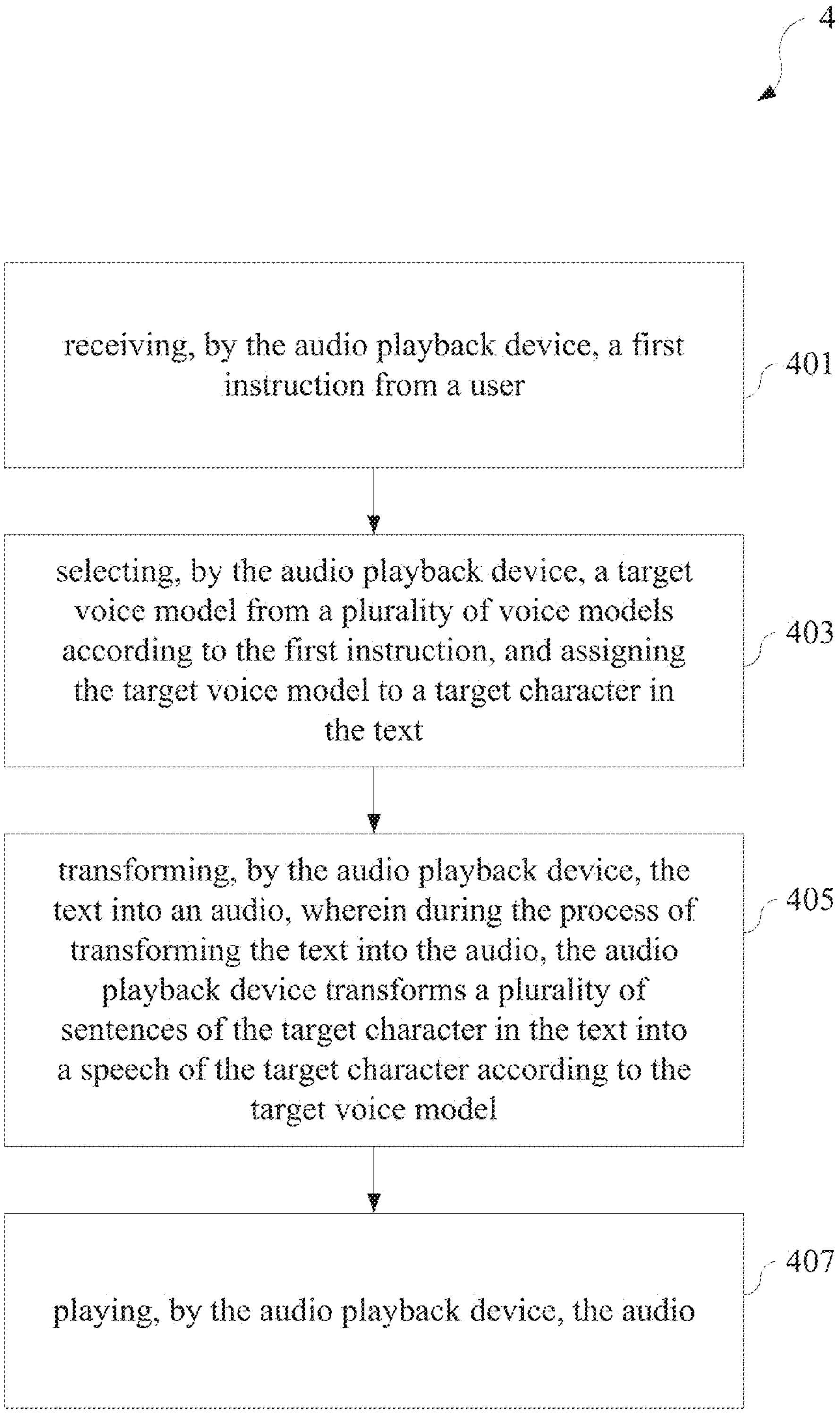
FIG. 4 illustrates a schematic view of an audio playback method according to one or more embodiments of the present invention.

FIG. 4 illustrates a schematic view of an audio playback method according to one or more embodiments of the present invention. The contents shown in FIG. 4 are merely for explaining the embodiments of the present invention instead of limiting the present invention.

Referring to FIG. 4, an audio playback method 4 for use in an audio playback device may comprise the following steps:

receiving, by the audio playback device, a first instruction from a user (labeled as step 401);

selecting, by the audio playback device, a target voice model from a plurality of voice models according to the first instruction, and assigning the target voice model to a target character in the text (labeled as step 403);

transforming, by the audio playback device, the text into an audio, wherein during the process of transforming the text into the audio, the audio playback device transforms sentences of the target character in the text into a speech of the target character according to the target voice model (labeled as step 405); and playing, by the audio playback device, the audio (labeled as step 407).

The order of steps 401 to 407 as shown in FIG. 4 is not limited. As long as it still can be implemented, the order of steps 401 to 407 as shown in FIG. 4 may be arbitrarily adjusted.

In some embodiments, the audio playback method 4 for use in the audio playback device may further comprise the following steps:

storing, by the audio playback device, a pre-established data for recording a plurality of other characters in the text and a plurality of other voice models corresponding to the other characters, wherein one of the other voice models is one of the voice models; and transforming, by the audio playback device, the sentences of the other characters in the text into a speech of the other characters according to the other voice models during the process of transforming the text into the audio, wherein the audio comprises the speech of the target character and the speeches of the other characters.

In some embodiments, each of the voice models may be built according to a specific personality and a plurality of acoustic features extracted by the audio playback device or a cloud server coupled with the audio playback device from an audio file, and the acoustic features may comprise a pitch feature, a speaking-rate feature and a spectral feature of the audio file. Moreover, not being a limitation, the audio file is recorded by a speaker.

In some embodiments, the audio playback method 4 for use in the audio playback device may further comprise:

receiving, by the audio playback device, a second instruction from the user; and labeling, by the audio playback device, one of the voice models as a favorite voice model according to the second instruction.

In some embodiments, the audio playback method 4 for use in the audio playback device may further comprise:

receiving, by the audio playback device, a third instruction from the user; and playing, by the audio playback device, a plurality of audio files for trial listening respectively transformed with the voice models according to the third instruction, so that the user selects one of the voice models as the target voice model based on the audio files for trial listening.

In some embodiments, each of the voice models may comprise a submodel of tone, and the submodel of tone may comprise a pitch parameter, a speaking-rate parameter and a spectral parameter.

In some embodiments, each of the voice models may comprise a submodel of tone, and the submodel of tone may comprise a pitch parameter, a speaking-rate parameter and a spectral parameter. Moreover, each of the voice models may further comprise a submodel of emotion, and the audio playback method 4 for use in the audio playback device may further comprise: adjusting, by the audio playback device, the submodel of tone with the submodel of emotion according to sentence emotions in the text, wherein each of the sentence emotions comprises one of doubt, happiness, anger and sadness.

In some embodiments, each of the voice models may comprise a submodel of tone, and the submodel of tone may comprise a pitch parameter, a speaking-rate parameter and a spectral parameter. Moreover, each of the voice models may further comprise a submodel of emotion, and the audio playback method 4 for use in the audio playback device may further comprise: adjusting, by the audio playback device, the submodel of tone with the submodel of emotion according to sentence emotions in the text, wherein each of the sentence emotions comprises one of doubt, happiness, anger and sadness; and identifying, by the audio playback device, the target character and sentence emotions of the target character in the text. Additionally, not being a limitation, each of the sentence emotions of the target character in the text may be determined by the audio playback device according to at least one emotion-related keyword appearing in the corresponding sentence of the target character in the text.

In some embodiments, all of the above steps of the audio playback method 4 for use in the audio playback device may be performed by the audio playback device 11 alone or jointly by the audio playback device 11 and the cloud server 13. In addition to the aforesaid steps, in some embodiments, the audio playback method 4 for use in the audio playback device may further comprise other steps corresponding to the operations of the audio playback device 11 and the cloud server 13 as mentioned above. These steps which are not mentioned specifically can be directly understood by people having ordinary skill in the art based on the aforesaid descriptions for the audio playback device 11 and the cloud server 13, and will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An audio playback device, comprising:

a storage, being configured to store a text;

an input device, being configured to receive a first instruction from a user;

a processor electrically connected with the input device and the storage, being configured to transform the text into an audio, wherein the audio comprises a speech of a target character;

an output device electrically connected with the processor, being configured to play the audio;

wherein the processor is further configured to:

analyze a content of the text to learn a specific personality of each of a plurality of characters of the text;

establish voice parameter adjustment modes corresponding to the specific personalities respectively;

build a plurality of voice models according to the voice parameter adjustment modes respectively with a plurality of acoustic features comprising a spectral feature related to spectrum extracted from an audio file;

select a target voice model from the voice models according to the first instruction, and assign the target voice model to the target character in the text;

and transform a plurality of sentences of the target character in the text into the speech of the target character according to the target voice model during the process of transforming the text into the audio.

2. The audio playback device of claim 1, wherein each of the voice models comprises a submodel of tone, and the submodel of tone comprises a pitch parameter, a speaking-rate parameter and a spectral parameter.

3. The audio playback device of claim 2, wherein each of the voice models further comprises a submodel of emotion, and the processor is further configured to adjust the submodel of tone with the submodel of emotion according to sentence emotions in the text, and each of the sentence emotions comprises one of doubt, happiness, anger and sadness.

4. The audio playback device of claim 3, wherein the processor is further configured to identify sentence emotions of the target character in the text.

5. The audio playback device of claim 4, wherein each of the sentence emotions of the target character in the text is determined by the processor according to at least one emotion-related keyword appearing in the corresponding sentence of the target character in the text.

6. The audio playback device of claim 1, wherein the acoustic features are extracted by the processor or a cloud server coupled with the audio playback device, and the acoustic features comprise a pitch feature, a speaking-rate feature and a spectral feature of the audio file.

7. The audio playback device of claim 6, wherein the audio file is a file recorded by a speaker.

8. The audio playback device of claim 1, wherein:

the storage is further configured to store a pre-established data for recording a plurality of other characters in the text and a plurality of other voice models corresponding to the other characters, and one of the other voice models is one of the voice models; and the processor is further configured to transform the sentences of the other characters in the text into a speech of the other characters according to the other voice models during the process of transforming the text into the audio, and the audio comprises the speech of the target character and the speeches of the other characters.

9. The audio playback device of claim 1, wherein:
the input device is further configured to receive a second instruction from the user; and
the processor is further configured to label one of the voice models as a favorite voice model according to the second instruction.

10. The audio playback device of claim 1, wherein:
the input device is further configured to receive a third instruction from the user; and
the output device is further configured to play a plurality of audio files for trial listening respectively transformed with the voice models according to the third instruction, so that the user selects one of the voice models as the target voice model based on the audio files for trial listening.

11. An audio playback method for use in an audio playback device, comprising:
analyzing, by the audio playback device, a content of a text to learn a specific personality of each of a plurality of characters of the text;
establishing, by the audio playback device, voice parameter adjustment modes corresponding the specific personalities respectively;
building, by the audio playback device, a plurality of voice models according to the voice parameter adjustment modes respectively with a plurality of acoustic features comprising a spectral feature related to spectrum extracted from an audio file;
receiving, by the audio playback device, a first instruction from a user;
selecting, by the audio playback device, a target voice model from the voice models according to the first instruction, and assigning the target voice model to a target character in the text;
transforming, by the audio playback device, the text into an audio, wherein the audio comprises a speech of the target character; and
playing, by the audio playback device, the audio;
wherein during the process of transforming the text into the audio,
the audio playback method further comprises:
transforming, by the audio playback device, a plurality of sentences of the target character in the text into the speech of the target character according to the target voice model.

12. The audio playback method of claim 11, wherein each of the voice models comprises a submodel of tone, and the submodel of tone comprises a pitch parameter, a speaking-rate parameter and a spectral parameter.

13. The audio playback method of claim 12, wherein each of the voice models further comprises a submodel of emotion, and the audio playback method further comprises: adjusting, by the audio playback device, the submodel of tone with the submodel of emotion according to sentence emotions in the text, wherein each of the sentence emotions comprises one of doubt, happiness, anger and sadness.

14. The audio playback method of claim 13, further comprising:
identifying, by the audio playback device, sentence emotions of the target character in the text.

15. The audio playback method of claim 14, wherein each of the sentence emotions of the target character in the text is determined by the audio playback device according to at least one emotion-related keyword appearing in the corresponding sentence of the target character in the text.

16. The audio playback method of claim 11, wherein the acoustic features are extracted by the audio playback device or a cloud server coupled with the audio playback, and the acoustic features comprise a pitch feature, a speaking-rate feature and a spectral feature of the audio file.

17. The audio playback method of claim 16, wherein the audio file is a file recorded by a speaker.

18. The audio playback method of claim 11, further comprising:
storing, by the audio playback device, a pre-established data for recording a plurality of other characters in the text and a plurality of other voice models corresponding to the other characters, wherein one of the other voice models is one of the voice models; and
transforming, by the audio playback device, the sentences of the other characters in the text into a speech of the other characters according to the other voice models during the process of transforming the text into the audio, wherein the audio comprises the speech of the target character and the speeches of the other characters.

19. The audio playback method of claim 11, further comprising:
receiving, by the audio playback device, a second instruction from the user; and
labeling, by the audio playback device, one of the voice models as a favorite voice model according to the second instruction.

20. The audio playback method of claim 11, further comprising:
receiving, by the audio playback device, a third instruction from the user; and
playing, by the audio playback device, a plurality of audio files for trial listening respectively transformed with the voice models according to the third instruction, so that the user selects one of the voice models as the target voice model based on the audio files for trial listening.

* * * * *